United States Patent [19]
Hill et al.

[11] 3,818,267
[45] June 18, 1974

[54] CIRCUIT BREAKER FOR THE LIGHTING SYSTEMS OF VEHICLES

[75] Inventors: George B. Hill; Bryant D. Lund, both of Salt Lake City, Utah

[73] Assignee: Brimco Manufacturing Company, Salt Lake City, Utah

[22] Filed: Feb. 26, 1969

[21] Appl. No.: 802,469

[52] U.S. Cl. .................................... 315/82, 307/10
[51] Int. Cl. ............................................. B60q 1/08
[58] Field of Search .................... 315/76, 77, 82, 83

[56] References Cited
UNITED STATES PATENTS
3,037,144   5/1962   LaMantia.............................. 315/82
3,374,394   3/1968   Miller................................... 315/82
3,388,288   6/1968   Kibler................................... 315/77
3,476,975   11/1969  Brock................................... 315/83

Primary Examiner—H. K. Saalbach
Attorney, Agent, or Firm—Trask & Britt; David V. Trask

[57] ABSTRACT

A compact, solid state, switching circuit which functions as an automatic circuit breaker for the lighting systems of a motor vehicle comprises a relay, energized through an electronic switch which is gated off, preferably after a time delay, when the ignition switch of the vehicle is opened.

10 Claims, 1 Drawing Figure

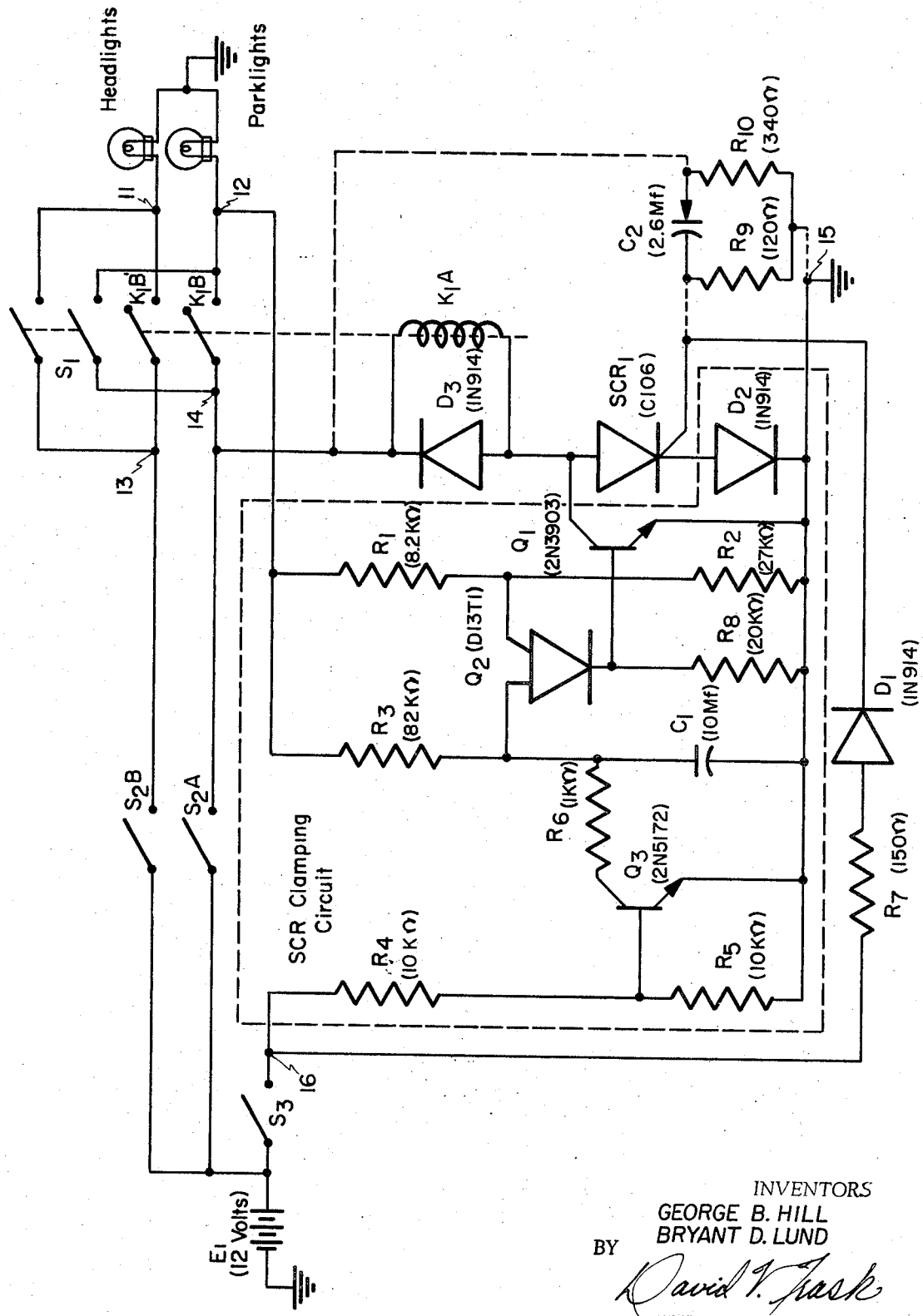

CIRCUIT BREAKER FOR THE LIGHTING SYSTEMS OF VEHICLES

BACKGROUND OF THE INVENTION

1. Field

This invention is directed to automotive lighting systems and provides a solid state-controlled circuit breaker to protect against prolonged accidental "on time" of the lighting system associated with a motor vehicle after its engine has been turned off.

2. State of the Art

When a motor vehicle is parked with its lighting system accidentally left on, the battery of the vehicle soon becomes discharged. Discharge of the battery in this fashion is particularly apt to occur when the headlights, or parking lights, of the vehicle have been turned on during the daytime. Safety considerations; such as poor visability due to fog, rain or snow; or the desire to identify a vehicle or its occupants with a particular civic or personal event may call for a motorist to drive with his lighting system energized during the daytime.

Many devices have been proposed to avoid draining of a vehicle's battery when the vehicle is parked with its lights on. Typical of the proposals of the prior art are those of U. S. Pat. Nos. 3,274,434; 3,374,394; 3,388,288; and 3,389,296. So far as is known, none of these proposals has achieved commercial success.

SUMMARY OF THE INVENTION

The present invention provides a compact, transistorized circuit breaker which may be easily installed in the lighting circuit of an automobile or other vehicle. The circuit breaker may be provided in a canister of very small size and the canister may be adapted to be plugged in or removed from the electrical system of the vehicle as desired without interupting the operability of the lighting circuit. Thus, the canister may be removed for repair or other purposes and ordinary manual control over the lighting system may be maintained. It is also convenient to provide a simple switch for disabling the claimed circuit breaker if normal manual control of the lighting circuit is desired.

The circuit breaker of the present invention automatically deenergizes a vehicle's lighting circuit a predetermined time after the vehicle's ignition switch is opened (shut-off) even though the light switch of the vehicle is left closed (on). The lighting circuit is deenergized without regard to outside light conditions. Thus, it is possible for a motorist to drive with his lights on during the daylight hours without risk of accidentally leaving the lights burning for prolonged periods after the automobile engine has been turned off.

The circuit breaker of this invention comprises a relay with contact points adapted for connection in circuit-breaking relationship in the lighting circuit of a vehicle. The contact points are normally open but are closed in response to current flow through a solid state electronic switch, such as a silicon controlled rectifier, in circuit with the coil of the relay. Means are provided for holding the electronic switch on when both the ignition switch and light switch are on and for opening the electronic switch in response to opening of the ignition switch, even though the light switch remains closed. An ideal electronic switch for this invention is a silicon controlled rectifier, gated on when the ignition switch is closed. Desirably, the claimed circuit breaker includes a time delay triggering circuit adapted to gate the silicon controlled rectifier off a prescribed time interval after the ignition switch is turned off. A very desirable time-delay triggering circuit comprises a unijunction transistor in circuit with an RC charging circuit clamped to ground when the ignition switch is on. When the ignition switch is opened, the RC charging circuit is unclamped and charges to fire the unijunction transistor. The anode of the silicon controlled rectifier is brought to cutoff potential in response to pulses from the unijunction transistor. Use of a programable unijunction transistor is an economical expedient for providing substantial time-delays before cutoff.

Certain embodiments of the invention include means for energizing the lighting circuit for a period by closing the light switch without first closing the ignition switch.

DESCRIPTION OF THE DRAWING

The drawing, which illustrates what is presently regarded as the best mode for carrying out the invention, is a schematic wiring diagram of a preferred embodiment. Practical values of the components are indicated in parentheses.

DESCRIPTION OF THE ILLUSTRATED EMBODIMENT

The illustrated embodiment may be wired directly into the electrical system of an automobile, or it may be provided in canister form with suitable plug connectors at the points designated 11 through 16. In plug-in form the canister is conveniently provided with pins insertable in a standard octyl socket mounted in the vehicle. The octyl socket desirably includes biased means for connecting points 11 and 12 to points 13 and 14, respectively, when the corresponding pins are removed from the socket. Alternatively, a single throw, double pole switch $S_1$ may be provided in the circuit, as illustrated, to maintain the lighting circuit in service when the canister is removed.

Separate contact points, $K_1B$ and $K_1B'$, of a relay $K_1$ are connected in series with the headlights and parking lights, respectively, of the lighting circuit. The lighting switch $S_2$, as in the case of most motor vehicles, includes separate contacts $S_2A$ for the parking lights and $S_2B$ for the headlights. The parking light contacts $S_2A$ of the switch conventionally close first and remain closed when the headlight contacts are closed. Accordingly, the coil $K_1A$ of the relay $K_1$ is connected to the parking light portion of the lighting circuit as shown.

The coil $K_1A$ of the relay $K_1$ is connected to ground by a silicon controlled rectifier $SCR_1$ and will remain energized only when $SCR_1$ is in its conducting state. $SCR_1$ is put in a state of conduction by applying a positive potential to its gate, provided that its anode is at a positive potential with respect to its cathode. Once $SCR_1$ is placed in a state of conduction, it will continue to conduct until the potential at its anode is no longer positive with respect to the potential at its cathode.

When the ignition switch $S_3$ of the vehicle is closed and the contact points $S_2A$ of the light switch $S_2$ are closed, a positive potential is applied through a diode $D_1$ to the gate of $SCR_1$, and the coil $K_1A$ of relay $K_1$ is energized. The contact points $K_1B$ and $K_1B'$ are thus closed to energize the parking lights and, if light switch contacts $S_2B$ are also closed, the headlights.

If the light switch $S_2$ is fully opened, the lighting circuit is shut-off by virtue of the open switch contacts $S_2A$ and $S_2B$. If switch contacts $S_2A$ are left closed, however, when the ignition switch $S_3$ is open, an SCR clamping circuit comprised of a diode $D_2$ and an NPN transistor $Q_1$ is energized to place the anode of $SCR_1$ at low potential relative to its cathode, thereby triggering it into its non-conducting state. Coil $K_1A$ of the relay $K_1$ is thus deenergized and its contacts $K_1B$ and $K_1B'$ open.

The SCR clamping circuit includes components to forward bias the transistor $Q_1$ in response to opening of the ignition switch $S_3$. With $Q_1$ so biased, the anode of $SCR_1$ is connected to ground. The diode $D_2$ establishes a higher-than-ground potential at the cathode of $SCR_1$. The transistor $Q_1$ is forward biased by the output from a unijunction transistor $Q_2$ connected to its base. In the illustrated instance, $Q_2$ emits pulses in response to the discharge of a capacitor $C_1$. When $Q_2$ is of the programable type shown, its firing potential is established by the voltage-dividing network comprised of the resistors $R_1$ and $R_2$. Capacitor $C_1$ charges at a rate determined by the value of the resistance $R_3$ in series with it. If desired, either $C_1$ or $R_3$ may be variable.

When the ignition switch $S_3$ is closed, a positive potential is applied to the base of NPN transistor $Q_3$ thereby shorting capacitor $C_1$ to ground so that unijunction transistor $Q_2$ will not fire. Thus, the SCR clamping circuit is suppressed so long as the ignition switch $S_3$ is closed. With the ignition switch open, however, the transistor $Q_3$ is non-conducting so that capacitor $C_1$ is charged through $R_3$. When $C_1$ is charged sufficiently to trigger unijunction transistor $Q_2$, a positive pulse is delivered to the base of NPN transistor $Q_1$, thereby triggering it into conduction and placing the anode of $SCR_1$ at essentially ground level as previously explained.

A swamping diode $D_3$ is desirably connected across the coil $K_1A$ as shown. The resistors $R_4$ through $R_{10}$ are included for proper balancing of voltages and currents in the circuit. The battery $E_1$ may be the conventional storage battery of a motor vehicle.

An optional circuit, comprised of a capacitor $C_2$ and resistors $R_9$ and $R_{10}$, may be included as indicated by broken lines so that the lighting circuits may be energized by switch $S_2$ without first turning on switch $S_3$. A pulse of positive potential is applied to the gate of $SCR_1$ when the capacitor $C_2$ charges in response to the closing of switch contacts $S_2A$. After capacitor $C_2$ becomes charged, it isolates the gate of $SCR_1$ from $E_1$ to permit $SCR_1$ to be turned off by pulses from $Q_2$. The diode $D_1$ blocks positive potential from the base of $Q_3$ when the ignition switch $S_3$ is open.

Reference herein to details of the illustrated embodiment is not intended to limit the scope of the claims which themselves recite those features regarded as essential to the invention. Those skilled in the art can readily construct equivalent circuit breakers from components other than those specifically disclosed.

We claim:

1. A lighting circuit for vehicles comprising:
    a battery having a grounded terminal and a load terminal;
    lights and a lighting switch connected in series circuit between the terminals of said battery, said switch having an open position and a closed position;
    normally open relay contact points connected in series with said lighting switch between said lights and said load terminal of said battery;
    a relay coil and electronic switch means connected in series circuit between the terminals of said battery, said relay coil being operably associated with said relay contact points to close said points when it is energized, and said electronic switch means having an open condition and a closed condition so that said relay coil is energized when said electronic switch means is in closed condition and deenergized when said electronic switch means is in open condition; and
    control circuit means, including an automobile ignition switch, connected between the load terminal of said battery and said electronic switch means operable to close said electronic switch means when both the lighting switch and the ignition switch are closed and to open said electronic switch means in response to opening of the ignition switch even though the lighting switch remains closed.

2. A lighting circuit according to claim 1, wherein the control circuit means includes a time-delay trigger circuit adapted to open said electronic switch means after the ignition switch has been open for a selected time interval.

3. A lighting circuit according to claim 1, wherein the electronic switch means is a silicon controlled rectifier (SCR); and the control circuit means comprises means for applying a positive potential to the gate of said SCR when the ignition switch is closed and means for connecting the anode of said SCR to ground in response to the opening of said ignition switch.

4. A lighting circuit according to claim 3, wherein the means for connecting the anode of the SCR to ground in response to opening of the ignition switch comprises a unijunction transistor triggering circuit including an RC charging circuit which is suppressed while the ignition switch is closed but which charges to trigger the unijunction transistor when the ignition switch is opened; and a transistor connected between the anode of the SCR and ground and connected to be triggered into conduction by pulses from said unijunction transistor.

5. A lighting circuit according to claim 4, wherein the capacitor of the RC charging circuit is shunted to ground through a transistor with its base connected to the ignition switch such that when the ignition switch is closed the transistor is triggered into conduction.

6. A lighting circuit according to claim 1, with a switch means in parallel with said normally open contact points for series connection in said lighting circuit such that said switch means may be operated to close said lighting circuit even when said contact points are open.

7. A solid state circuit breaker for the lighting circuit of vehicles in which the lighting switch for energizing the lighting circuit is separately operable from the ignition switch of the vehicle, comprising:
    first, second, third, and fourth terminals for connection to the grounded side of a vehicle's battery, the load side of a vehicle's ignition switch, the load side of a vehicle's lighting switch, and the load side of a vehicle's lights, respectively;
    normally open contact points connected in series between said third and fourth terminals;
    a relay coil and electronic switch means having open and closed conditions connected in series between said third and first terminals, and control circuit means connected between said second terminal and said electronic switch means, operable when the terminals are connected as recited hereinbefore to close said electronic switch means when both the ignition switch and lighting switch are closed and to open said electronic switch means in response to opening of the ignition switch even though the lighting switch remains closed.

8. A circuit breaker according to claim 7, wherein the electronic switch means is an SCR and the control circuit means comprises a unijunction transistor triggering circuit including an RC charging circuit which is suppressed while the ignition switch is closed but which charges to trigger the unijunction transistor when the ignition switch is opened; and a transistor connected between the anode of the SCR and ground and connected to be triggered into conduction by pulses from said unijunction transistor.

9. A circuit breaker according to claim 8 wherein the means for connecting the anode of the SCR to ground in response to opening of the ignition switch comprises a unijunction transistor triggering circuit including an RC charging circuit which is suppressed while the ignition switch is closed but which charges to trigger the unijunction transistor when the ignition switch is opened; and a transistor connected between the anode of the SCR and ground and connected to be triggered into conduction by pulses from said unijunction transistor.

10. A circuit breaker according to claim 4 wherein the capacitor of the RC charging circuit is shunted to ground through a transistor with its base connected to the ignition switch such that when the ignition switch is closed the transistor is triggered into conduction.

* * * * *